United States Patent [19]

Jacaruso et al.

[11] 4,090,900
[45] May 23, 1978

[54] LAMINATE PRODUCTS USEFUL IN THE PRODUCTION OF BRA CUPS AND PROCESS FOR MAKING SAME

[75] Inventors: Salvatore Jacaruso, Maspeth; Joseph A. Giuliano, Oyster Bay, both of N.Y.

[73] Assignee: Acar Laminators Corp., Brooklyn, N.Y.

[21] Appl. No.: 702,907

[22] Filed: Jul. 6, 1976

[51] Int. Cl.² .................. A41C 3/12; B29C 27/14; B32B 27/02; B32B 27/08; B32B 31/12; B32B 31/20

[52] U.S. Cl. .................. 156/85; 128/463; 128/464; 128/517; 428/236

[58] Field of Search .................. 156/85; 428/236; 128/463, 464, 516, 517

[56] References Cited

U.S. PATENT DOCUMENTS

| 1,323,022 | 11/1919 | Crowell | 428/326 |
|---|---|---|---|
| 2,164,499 | 7/1939 | Coughlin | 428/236 |
| 2,357,392 | 9/1944 | Francis | 128/463 |
| 2,609,539 | 9/1952 | Shearer | 128/464 |
| 3,064,329 | 11/1962 | Westberg et al. | 128/463 |
| 3,070,870 | 1/1963 | Alexander et al. | 128/463 |
| 3,202,565 | 8/1965 | Loftin | 128/463 |
| 3,348,549 | 10/1967 | Brodmann et al. | 128/517 |
| 3,799,174 | 3/1974 | Howard | 128/464 |

FOREIGN PATENT DOCUMENTS

| 11,405 of | 1893 | United Kingdom | 428/236 |

*Primary Examiner*—J.C. Cannon
*Attorney, Agent, or Firm*—Raymond P. Niro; John L. Isaac

[57] ABSTRACT

A process is provided for making laminate sheet materials, having outer fabric layers and an intermediate nonwoven fiberfill layer, which are particularly suitable for use in making molded, one-piece, bra cups. The process involves the application of an adhesive to the intermediate fiberfill layer through a reverse roll technique and the subsequent curing and partial shrinking of the individual layers of the laminate structure through the application of uniform and constant pressure and heat before molding.

7 Claims, 3 Drawing Figures

LAMINATE PRODUCTS USEFUL IN THE PRODUCTION OF BRA CUPS AND PROCESS FOR MAKING SAME

BACKGROUND OF THE INVENTION

This invention relates to a process for making laminated sheet materials, and to specific laminate materials made by such a process which have been found to be particularly useful in making molded, one-piece, non-stitched bra cups.

At present, the bra cup portion of brassieres, as they are currently manufactured, are made in a multi-step process that requires, among other things, that two or more pieces of laminated fabric be separately molded, sewn together to form a completed bra cup, and then integrated into a finished brassiere. Such a manufacturing technique involves a considerable amount of manual sewing and cutting by skilled personnel; it requires the purchase and use of expensive equipment such as sewing machines; and it requires excessive handling of individual piece goods as they are cut and fabricated into a finished bra cup. Perhaps even more importantly, however, the repeated cutting and sewing required to fabricate bra cups from separate half pieces greatly increases the opportunity for manufacturing error, by introduction of the human variable of sewing, and often times results in poorly fitting bra cups that must be altered through adjustment of straps and accessories. In addition, the seams which appear across the center portion of bra cups made by such currently used brassiere manufacturing techniques are less comfortable for wearers, less aesthetically pleasing because the seams tend to show through some blouses and sweaters as ridges, and thus, far less useful for a variety of fashion end uses than one-piece molded bra cups.

A one-piece molded bra cup, therefore, would not only eliminate many of the comfort and aesthetic problems for wearers, but would greatly reduce brassiere manufacturing costs by eliminating both the need for additional manufacturing personnel to cut and sew separate half-pieces of fabric together and the need for additional sewing and cutting equipment to carry out the bra cup manufacture. As a consequence of the many advantages which result from the use of a one-piece molded bra cup (instead of the conventional two-piece approach), considerable interest has developed in the manufacture of laminate materials which are capable of being efficiently and effectively molded into a one-piece bra cup. Although processes have been attempted to manufacture laminate materials suitable for one-piece molding, none has proved entirely successful. In part, this has happened because of the inability of the resulting laminate materials to meet the very stringent commercial requirements for bra cups, such as permanence of form, washability, strength, durability, softness, flexibility, smoothness of inner surfaces, and perhaps most importantly, the absence of wrinkling, fabric slippage and decorative pattern distortion.

The laminate materials of the present invention, made by the process of the present invention, have overcome the various problems associated with prior art laminate compositions, and, as a consequence, are particularly well suited for use in making molded one-piece bra cups that can meet the strigent commercial criteria for bra cups and brassieres.

SUMMARY OF THE INVENTION

The present invention involves a unique process for the manufacture of multi-layered laminate sheets, which have been demonstrated to be particularly suitable for use in making molded one-piece bra cups for brassieres. Preferably, the uniformly pre-shrunk, laminated sheet, and thus the completed bra cup as well, has a three layer construction, the top and bottom outer layers preferably being constructed from woven fabric or lace-like materials made from polyester or related type fibers, while the center or intermediate layer is preferably constructed from a non-woven fiberfill type material of bonded polyester or related fibers. The materials used for the outer and intermediate layers are desirably compatible with one another and have identical or similar forming and shrinking characteristics during molding or the application of uniform heat and pressure.

In the process of this invention an adhesive is applied to the center fiberfill layer in two separate passes, a first pass in which one of the outer fabric layers is bonded to one side of the fiberfill layer, and then dried and partially shrunk through the application of heat and uniform pressure, and a second pass in which the other outer fabric layer is bonded in the same manner to the opposite side of the fiberfill layer and similarly dried and partially shrunk.

Sufficient adhesive is applied to the intermediate fiberfill layer to insure a strong bond between it and the outer fabric layers. Preferably, adhesive is applied to the fiberfill layer by a reverse roll which is rotated in a direction opposite to the direction that the fiberfill layer itself is moving. This reverse direction application of adhesive results in deeper penetration of adhesive material into the fiberfill layer, insures the formation of a desirably strong bond between the outer and fiberfill layers, and promotes uniform shrinkage of the outer and intermediate fiberfill layers during subsequent molding operations, all of which enhance the resultant properties of the finished laminate sheet and make it highly desirable for use in making molded one-piece bra cups.

After reverse application of adhesive, the coated side of the fiberfill layer is brought into contact with one of the outer fabric layers, and pressed against a rotating heated drum by a moving blanket which applies a uniform and constant pressure to the two layers. This continuous and uniform application of heat and pressure also serves to enhance the properties of the resultant laminate sheet by insuring a controlled uniform shrinkage of the laminate material.

Thus, through proper selection of shrink compatible fabric and fiberfill materials, the use of a reverse application of adhesive, and the application of uniform and constant heat and pressure after the application of adhesive, a controlled pre-shrinkage of the resultant laminate sheet occurs before the sheet is heat and pressure molded into finished one-piece bra cups. During subsequent heat and pressure molding, therefore, the laminate materials made by the process of this invention, do not experience non-uniform shrinkage between layers, do not warp or wrinkle, and do not have the many undesired properties that make other laminate materials ill-suited for use in making molded one-piece bra cups.

DESCRIPTION OF THE PREFERRED EMBODIMENT

Figure 1:
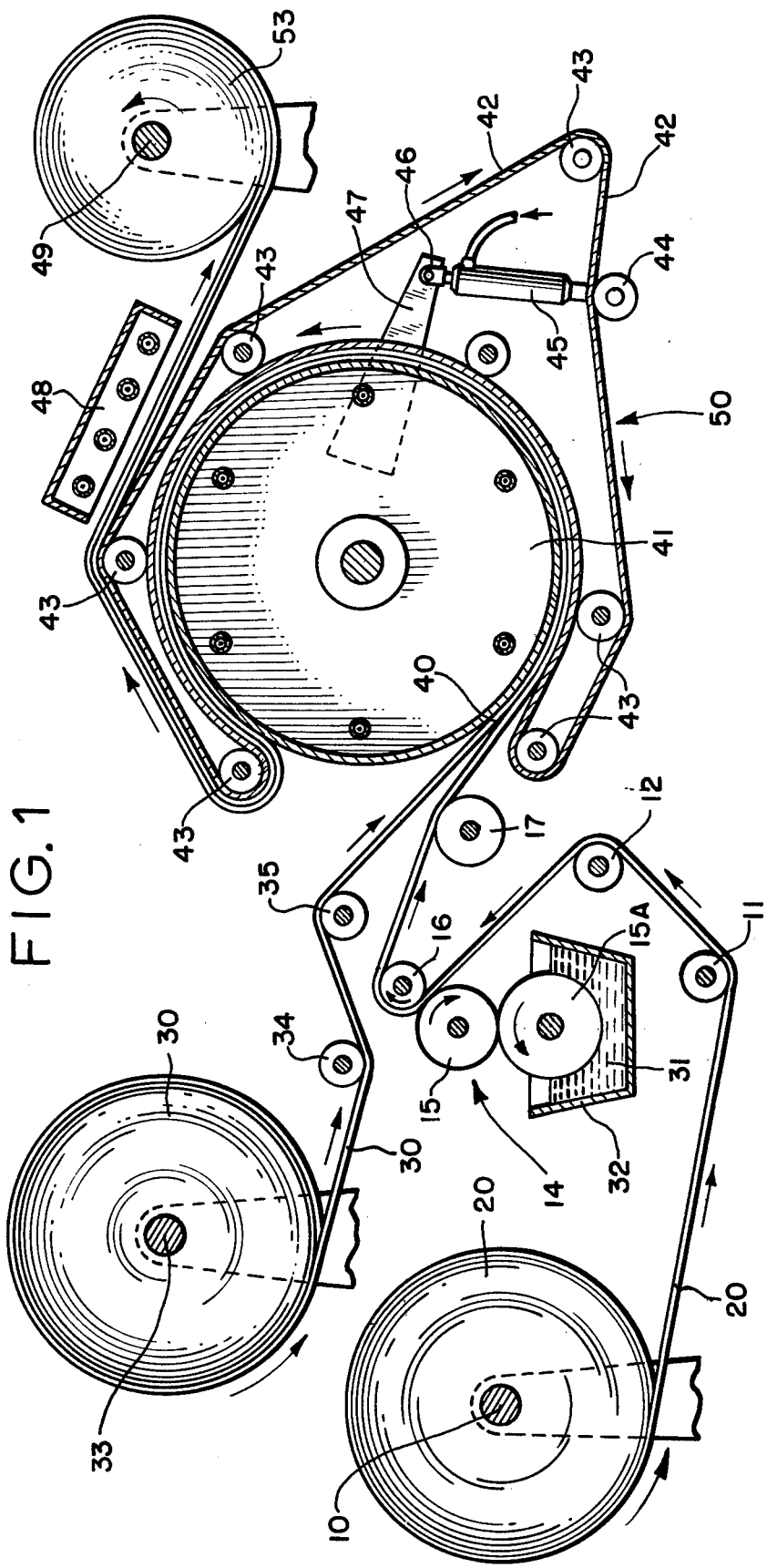
FIG. 1 is a schematic view of one embodiment of the laminate making process of this invention, illustrating the manner in which one of the outer fabric layers of the finished laminate products is bonded to an intermediate fiberfill layer of material.

Referring now to the drawings, which illustrate one embodiment of the process and resultant laminate products of this invention, FIG. 1 shows the general arrangement and operative relation of various component parts of a modified laminating apparatus useful in the practice of the process of this invention.

In the practice of the illustrated embodiment of the present invention, a roll of non-woven fiberfill material 20 (the intermediate layer in the resultant laminate sheet), after being properly stabilized by roll 11, is passed from supply roll 10 around an adjustable roll 12, which adjusts and insures that a proper feeding angle exists and that tension is applied to the fiberfill layer 20 as it is passed into the adhesive application area, indicated generally as 14. In the adhesive application area, sufficient adhesive is applied to the fiberfill layer 20 to insure a strong bond between it and the outer fabric layer 30. This is at least in part accomplished through the action of reverse roll 15, which as indicated by the arrows, is rotated in a clockwise direction opposite to the direction of movement of fiberfill layer 20.

Adhesive material 31, contained in trough 32, is removed by a partially immersed rotating transfer roll 15A, and is applied first to reverse roll 15, and then in a continuous manner to the moving fiberfill layer 20. The reverse action of roll 15 and fiberfill layer 20 results in a deep penetration of adhesive into the continuously moving fiberfill layer and greatly enhances the resultant properties of the finished laminate sheet. Preferably, the speed of rotation of reverse roll 15 is regulated so that the appropriate quantity and degree of penetration of adhesive material 31 can be appropriately adjusted for various types of fiberfill material.

After application of adhesive, the coated fiberfill layer is passed around a feeder roll 16, which adjusts the degree of tension applied to the fiberfill layer 20. From feeder roll 16, the coated and partially impregnated fiberfill layer moves across spreader roll 17, which stretches and elongates the fiberfill to increase its surface area immediately prior to its initial point of contact 40 with outer fabric layer 30.

The outer fabric layer 30 in turn is removed from supply roll 33 and passed across two bars 34 and 35, the latter of which is slightly bowed so as to maintain a smooth and taunt surface for the fabric layer 30 immediately prior to its initial point of contact 40 with the treated fiberfill layer 20.

The heating and curing area of the illustrated embodiment, indicated generally as 50, accomplishes two objectives in the laminating process; it first serves to bond the outer fabric layer 30 to the coated fiberfill layer 20, and secondly serves to uniformly and partially pre-shrink the resultant laminate material. This heating and curing area 50 is preferably made up of a heated rotating drum 41 and a superimposed endless blanket 42, which surrounds and engages the major portion of drum 41. A series of rolls 43 are spaced about and rotatably support endless blanket 42 as it rotates about the outer circumference of drum 41. The rollers 43 maintain blanket 42 in spaced, circumferential relationship with drum 41 so that blanket 42 can apply a uniform and constant pressure to the treated fiberfill layer 20 and fabric layer 30 as they come into contact around rotating drum 41.

The uniform pressure is applied by piston 45, which is attached at one end to roll 44 and at its other end 46 to the frame 47 of the laminating apparatus. During operation, piston 45 is securely locked into position on frame 47 to maintain a constant and uniform pressure on endless blanket 42, and thus, on the contacting outer fabric layer 30 and intermediate fiberfill layer 20 as they pass between blanket 42 and heated drum 41.

After the contacting outer fabric layer 30 and fiberfill layer 20 travel across the circumference (approximately 4/5ths the circumference) of heated drum 41, they are passed beneath heater 48, which acts to further dry, cure and shrink the laminated layers, and then are collected on take-up roll 49. In order to complete the entire laminating process and make a three-layered structure, the two laminated layers, indicated as 53, are removed from take-up roll 49, placed on roll 10, and reprocessed in a second pass through the process so that a second outer layer 30 can be similarly bonded to the other (non-bonded) side of fiberfill layer 20.

Figure 2:
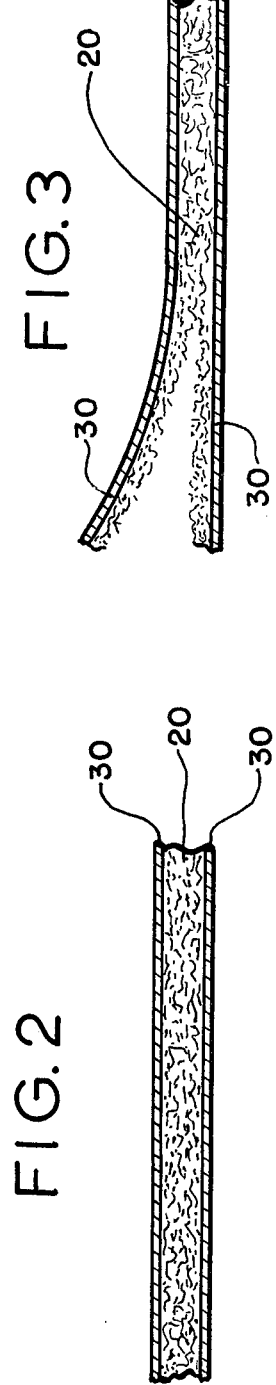
FIG. 2 is an enlarged end view of a pre-shrunk finished three-ply laminate material, suitable for use in making one-piece molded bra cups, having a non-woven fiberfill intermediate layer disposed between and bonded to two separate fabric outer layers.

The resultant laminate sheet, therefore, made by the process of the present invention and shown generally in FIG. 2 comprises two outer fabric layers 30 which are strongly bonded to a non-woven, intermediate fiberfill layer 20. Preferably, outer fabric layers 30 and intermediate fiberfill layer 20 are made from compatible fiber materials which have similar or identical shrink properties when subjected to heat and pressure. Although a variety of materials can be used for the fabric layers 30 and fiberfill layer 20, provided they are compatible, polyester fibers have been found to be particularly suitable for use in the present invention. In particular, woven polyester fibers, such as "Dacron" polyester or "Qiana" polyester, as well as laces and woven polyester-cotton mixtures having having deniers in the range of 20 to 70 have been found to be particularly suitable for use as the outer fabric layers. The intermediate fiberfill layer, on the other hand, is desirably made of random, garnet (fibers oriented in one direction) or isomisor (fibers oriented in $-x$ and $-y$ directions) non-woven fibers, preferably polyester staple fibers of the conventional drawn or oriented type employed in the textile industry, and having a length in the range of one to two inches, or unplasticized polyester staple fibers of the undrawn or amorphous type, also having a length in the range of one to two inches. The adhesive materials found particularly useful in the practice of this invention are aqueous dispersions or emulsions of carboxylic acrylate polymers, including cross-linked synthetic polyacrylic aqueous emulsions, having a shipped viscosity of about 7,500 cps, a density of about 8.8 pounds/gallon, a pH of about 6.7, a total solids content of about 44.5 percent by weight and a cure time of approximately three minutes at 290° F. It should be understood, of course, that adhesive materials and outer fabric and intermediate, non-woven fiberfill materials other than those discussed herein would be suitable for use in the practice of the present invention, the polyester fibers and polyacrylate adhesives merely being more desirable than other compositions.

It has been determined that the properties of the partially pre-shrunk laminate products of this invention are particularly well suited for making molded, one-piece bra cups. For example, the laminate products of this invention are porous and breathable so as to permit the passage of air and moisture; they do not abrade skin; and after molding they have sufficient body, strength and resilience to hold their shape, even after repeated washing. Perhaps even more significantly, the laminate products of this invention can be readily heat and pressure molded without wrinkling or distorting, and because of the controlled pre-shrink which occurs during processing, without excessive, nonuniform shrinking between individual laminate layers.

Figure 3:
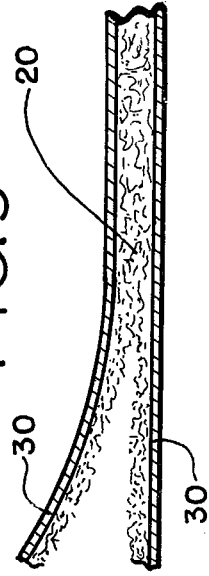
FIG. 3 is an end view of one embodiment of the pre-shrunk three-ply laminate material of this invention, which illustrates the high degree of bonding which exists between the outer and intermediate layers of material, as the outer layers are pulled apart.

Although it is generally preferred that adhesive be applied to the fiberfill layer during processing, it is sometimes more desirable for some fabrics to reverse the positions of the outerfabric and fiberfill layers so that adhesive is applied to the outer fabric layers instead of the fiberfill layer. The amount of adhesive applied to either the fiberfill or outer layers is adjusted by means of the speed of reverse roll 15. Typically, sufficient adhesive is applied to create a strong bond between the outer fabric and intermediate fiberfill layers. As shown in FIG. 3, sufficient adhesive is considered applied when the outer layers of the finished laminate cannot be torn apart without a considerable amount of the fiberfill layer remaining attached to each of the outer fabric layers. Such a strong bond between the outer fabric layers and intermediate fiberfill layer prevents a total shift between the outer layers during molding, which has been found to have an undersirable effect on the resultant properties of the molded bra cup.

During the application of heat and uniform pressure to the contacting fabric and fiberfill layers as they pass around rotating drum 41, temperatures in the range of about 175° F to 330° F have been found to be suitable to adequately cure and pre-shrink the fabric materials useful in the practice of this invention. Temperatures in the range of about 230° to 240° F, for example, are particularly suitable for the polyester fibers and polyacrylic adhesives used in the practice of the present invention. The exact temperature ranges selected for any given combination of outer fabric and intermediate fiberfill layers is typically below that point at which the fiber memory is broken, although it is possible that for some fibers, temperatures above that required to break the fiber memory can be used.

Sufficient pressure is applied by the endless blanket 42 to insure the formation of a firm bond between the fabric and fiberfill layers, and is best determined for any given fabric combination through empirical techniques, i.e., pressures sufficient to maintain the fabric and fiberfill layers in firm contact so that after curing the outer fabric layers cannot be torn apart without removing portions of attached fiberfill as shown in FIG. 3.

Although there are many advantages to the process of the present invention, the most meaningful advantage is that it can be used to continuously make laminate sheets that are especially suited for molding one-piece bra cups. It is believed that these advantageous properties are imparted to the finished laminate sheets because of the action of the variable speed reverse roll which drives adhesive into the fiberfill layer, thus insuring a strong bond, and because of the constant and uniform application of heat and pressure to the laminate layers as adhesive is being cured. In this way, the finished three-layered laminate is partially pre-shrunk in a uniform fashion, and is thus not susceptible to the many problems associated with rapid, non-uniform shrinking during subsequent molding operations.

Although only three-layered laminates have been discussed herein, it should be understood that multi-layered laminate products can be made from other materials than disclosed herein without departing from the spirit and scope of the present invention.

We claim:

1. A process for the continuous manufacture of a pre-shrunk laminate composition, which includes at least two fabric outer layers and an intermediate fiberfill layer disposed between said outer layers, comprising (a) continuously applying a flow of an adhesive composition to said intermediate fiberfill layer in a direction opposite to the direction of movement of said fiberfill layer to penetrate said fiberfill layer with said adhesive, (b) serially bringing the opposite sides of the faces of said fiberfill layer into intimate contact with said fabric outer layers, and (c) uniformly applying heat and pressure to said contacted layers of fabric and fiberfill at temperatures and pressures and for a time sufficient to securely bond said layers together while uniformly pre-shrinking said layers.

2. The process of claim 1 wherein said adhesive is applied to said fiberfill layer by means of a roller which contacts and rotates in a direction opposite the direction of movement of said fiberfill layer, and wherein the uniform application of heat and pressure is effected by means of a rotating heated drum and a superimposed endless pressure blanket.

3. The process of claim 1 wherein one side of said fiberfill layer is first treated with adhesive and bonded to one of said outer fabric layers, after which the opposite side of said fiberfill layer is treated with adhesive and bonded to the second of said outer fabric layers.

4. The process of claim 3 wherein said fabric outer layers are woven polyester fabric, said fiberfill layer comprises a non-woven matt of staple polyester fibers, and said adhesive composition is a polyacrylic aqueous emulsion.

5. The process of claim 3 wherein the said contacted fabric and fiberfill layers are heated to a temperature in the range of about 175° to 330° F.

6. A process for the continuous manufacture of a uniformly pre-shrunk laminate composition suitable for molding into one-piece bra cups and which includes oppositely disposed outer fabric layers and an intermediate fiberfill layer of non-woven staple fibers disposed therebetween, said layers being held together with an adhesive composition that securely bonds said outer fabric layers to said intermediate fiberfill layer by substantially penetrating said intermediate layer, said process comprising continuously applying a flow of said adhesive composition to said intermediate fiberfill layer by directing said adhesive composition into said intermediate layer in a direction opposite the direction of movement of said intermediate layer to penetrate said fiberfill layer with said adhesive, serially bringing the opposite sides of said fiberfill layer into intimate contact with said fabric outer layers, and uniformly and substantially simultaneously applying heat and pressure to said contacted layers of fabric and fiberfill at temperatures and pressures and for a time sufficient to securely bond said layers together while uniformly pre-shrinking said layers.

7. The process of claim 6, wherein said laminate composition is uniformly pre-shrunk by application of said heat and constant pressure to the laminated layers of fabric and fiberfill before said applied adhesive composition has completely dried.

* * * * *